United States Patent
Mizutani

(10) Patent No.: US 8,150,104 B2
(45) Date of Patent: Apr. 3, 2012

(54) MOVING OBJECT DETECTION APPARATUS AND COMPUTER READABLE STORAGE MEDIUM STORING MOVING OBJECT DETECTION PROGRAM

(75) Inventor: Masami Mizutani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 157 days.

(21) Appl. No.: 12/767,189

(22) Filed: Apr. 26, 2010

(65) Prior Publication Data

US 2010/0202661 A1 Aug. 12, 2010

Related U.S. Application Data

(63) Continuation of application No. PCT/JP2007/001404, filed on Dec. 14, 2007.

(51) Int. Cl.
*G06K 9/00* (2006.01)

(52) U.S. Cl. .............. 382/103; 382/190; 382/169

(58) Field of Classification Search .............. 382/103, 382/107, 190, 118, 218, 254; 348/169, 170, 348/171, 172

See application file for complete search history.

(56) References Cited

U.S. PATENT DOCUMENTS

| 6,956,603 B2* | 10/2005 | Fujii | 348/169 |
| 7,194,110 B2* | 3/2007 | Qian | 382/103 |
| 2003/0025794 A1 | 2/2003 | Fujii | |

FOREIGN PATENT DOCUMENTS

| EP | 1 282 077 A2 | 2/2003 |
| JP | 8-241414 | 9/1996 |
| JP | 2001-167282 | 6/2001 |
| JP | 2003-44861 | 2/2003 |
| JP | 2006-318345 | 11/2006 |
| JP | 2007-172540 | 7/2007 |
| JP | 2007-286724 | * 11/2007 |

OTHER PUBLICATIONS

International Search Report for PCT/JP2007/001404, mailed Jan. 15, 2008.

* cited by examiner

*Primary Examiner* — Vikkram Bali
*Assistant Examiner* — Nancy Bitar
(74) *Attorney, Agent, or Firm* — Staas & Halsey LLP

(57) ABSTRACT

The approaching object detection unit in a moving object detection apparatus for a moving picture calculates a moving distance of each characteristic point in an image frame obtained at time point t−1, on the basis of an image frame obtained at time point t and an image frame obtained at time point t−1, and on the basis of the image frame obtained at time point t−1 and an image frame obtained at time point t+m, a moving distance of a characteristic point is in the image frame obtained at time point t−1 and has a moving distance to be less than a prescribed value.

11 Claims, 10 Drawing Sheets

FIG. 4A

| ITEM NUMBER | IMAGE PATCH DATA | COORDINATE | TM | NUMBER OF TIMES OF BEING TRACKED |
|---|---|---|---|---|
| 1 | IMAGE DATA #1 | x1 | t-1 | N1 |
| 2 | IMAGE DATA #2 | x2 | t-1 | N2 |
| 3 | IMAGE DATA #3 | x3 | t-1 | N3 |
| 4 | IMAGE DATA #4 | x4 | t-1 | N4 |
| 5 | IMAGE DATA #5 | x5 | t-1 | N5 |

FIG. 4B

| ITEM NUMBER | IMAGE PATCH DATA | COORDINATE | TM | NUMBER OF TIMES OF BEING TRACKED |
|---|---|---|---|---|
| 1 | IMAGE DATA #1 | x1 | t-1 | N1 |
| 2 | IMAGE DATA #2 | x2 | t-1 | N2 |
| 3 | IMAGE DATA #3' | x3+v3 | t | N3+1 |
| 4 | IMAGE DATA #4' | x4+v4 | t | N4+1 |
| 5 | IMAGE DATA #5' | x5+v5 | t | N5+1 |

FIG. 4C

| ITEM NUMBER | IMAGE PATCH DATA | COORDINATE | TM | NUMBER OF TIMES OF BEING TRACKED |
|---|---|---|---|---|
| 1 | IMAGE DATA #1 | x1 | t-1 | N1 |
| 2 | IMAGE DATA #2" | x2+v2' | t+1 | N2+1 |
| 3 | IMAGE DATA #3" | x3+v3+v3' | t+1 | N3+2 |
| 4 | IMAGE DATA #4" | x4+v4+v4' | t+1 | N4+2 |
| 5 | IMAGE DATA #5" | x5+v5+v5' | t+1 | N5+2 |

FIG. 6A

| ITEM NUMBER | IMAGE PATCH DATA | COORDINATE | TM | LEN |
|---|---|---|---|---|
| 1 | IMAGE DATA #1 (t-1) | x1 | t-1 | 2 |
| 2 | IMAGE DATA #2 (t-4) | x2 | t-4 | 3 |
| 3 | IMAGE DATA #3 (t-2) | x3 | t-2 | 3 |
| 4 | IMAGE DATA #4 (t) | x4 | t | 4 |
| 5 | IMAGE DATA #5 (t) | x5 | t | 5 |

FIG. 6B

| ITEM NUMBER | IMAGE PATCH DATA | COORDINATE | TM | LEN |
|---|---|---|---|---|
| 1 | IMAGE DATA #1 (t-1) | x1 | t-1 | 2 |
| 2 | IMAGE DATA #2 (t-4) | x2 | t-4 | 3 |
| 3 | IMAGE DATA #5 (t) | x5 | t | 5 |

| ITEM NUMBER | IMAGE PATCH DATA | COORDINATE | TIME STAMP |
|---|---|---|---|
| 1 | IMAGE DATA #1(t-1) | x1 | t-1 |
| 2 | IMAGE DATA #2(t-4) | x2 | t-4 |
| 3 | IMAGE DATA #3(t-2) | x3 | t-2 |
| 4 | IMAGE DATA #4(t) | x4 | t |
| 5 | IMAGE DATA #5(t) | x5 | t |
| 6 | IMAGE DATA #FT3(t) | x_FT3 | t |

FIG. 8

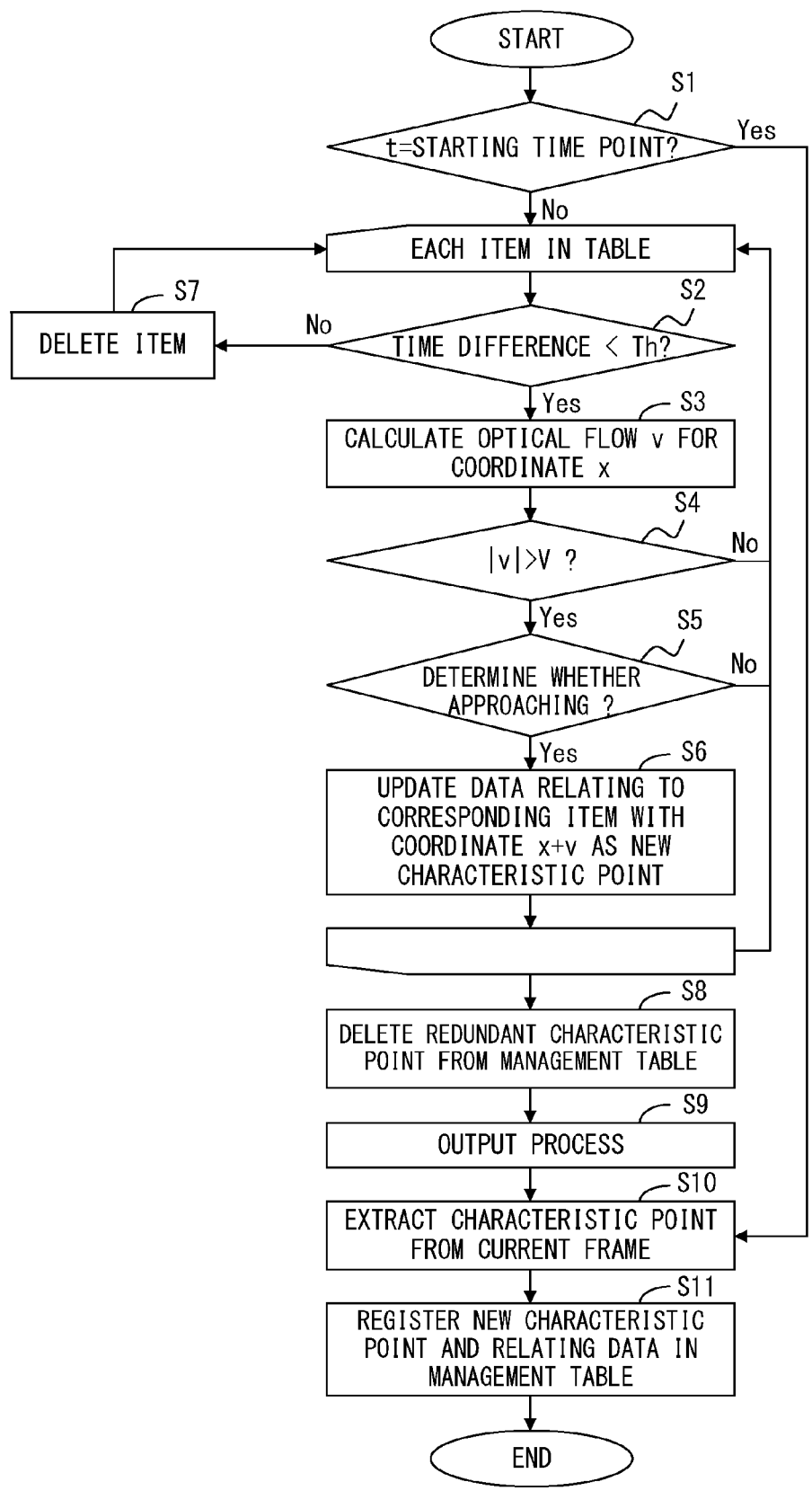
F I G. 9

MOVING OBJECT DETECTION APPARATUS AND COMPUTER READABLE STORAGE MEDIUM STORING MOVING OBJECT DETECTION PROGRAM

CROSS-REFERENCE TO RELATED APPLICATIONS

This application is a continuation of PCT application PCT/JP2007/001404 which was filed on Dec. 14, 2007.

FIELD

The embodiments discussed herein are related to a technology of detecting a moving object in a moving picture, and particularly to a technology of detecting an approaching object by performing image processing.

BACKGROUND

Conventionally, there have been available onboard blind-spot camera image display apparatuses (blind corner monitors) that have a camera at the front end or the like of a vehicle so as to display, on a display device, images of the scenes to the right and left of the vehicle, thereby assisting the driver in judgment at intersections or the like where there are many blind spots. The driver can confirm the scenes to the right and left of the vehicle by viewing images on the monitor device so as to reduce the risk of overlooking approaching objects.

However, overlooking of and erroneous judgment about objects approaching from distant spots have still occurred, leaving a possibility of accidents occurring no matter how much the driver is paying attention to the monitor device. This is due to the following reasons.

An object approaching from a distant spot occupies only a small area in an image, making the object unnoticeable in the background, and the shapes of automobiles or motorcycles or the like cannot easily be recognized by drivers. Also, because these objects are approaching, they are moving only over a small distance in the images, making it difficult for drivers to recognize the movement. In view of this, a technique has been provided that detects approaching objects through image processing performed on camera-image data so as to emphasize the area displaying those approaching objects (for example, see Patent Document 1).

As one of the techniques for detecting moving objects in a moving picture, there are optical flow methods, which can roughly be categorized into a block matching method and a gradient method.

As described above, an object approaching from a distant spot moves only over a short distance in an image, and this distance is, in some cases, within one pixel. For example, for a blind corner monitor apparatus, about five frames are required to detect an approaching vehicle that is about fifty meters away from the camera under a particular lens setting, where a horizontal movement in one pixel is observed.

In such a case, when an optical flow is to be obtained by using a block matching method, the flow is calculated to be zero unless sub-pixel estimation is performed. Because of this, conventional moving object detection techniques have been insufficiently accurate in detecting objects at distant spots.

In the moving object judgment method in Patent Document 1 above, a gradient method, including a sub-pixel estimation function, is used for an optical flow of a distant spot, and thereby a flow of a movement within one pixel is calculated.

However, a gradient method uses a mathematical approximation under an assumption that luminance is consistent between two frames. This has resulted in the drawback that calculated values are often unstable.

Also, when sub-pixel estimation is performed, a non-zero flow is also calculated for a still area while a value of a flow of one pixel or smaller is calculated for a moving area, making it difficult to discriminate between a moving area and a still area.

Further, the technique of Patent Document 1 has a problem wherein information indicating whether a particular area in an image is a distant area or a near area is needed in order to discriminate between a moving area and a still area on the basis of a block matching method and a gradient method.

Further, a gradient method involves complex division processes. This slows the processing speed, and makes it difficult to mount this method on hardware. Also, a gradient method detects very small movements, causing the problem of picking up a lot of noise.

When a flow smaller than one pixel is to be calculated using a block matching method, the interval between two frames used for the flow calculation has to be longer than one time point. However, when the time interval between two frames to be used is simply expanded, a position change of objects moving at a high speed or of objects existing near the camera is made too great in images, and this causes a situation in which a point in a frame corresponding to a point in another frame is out of the search scope. Thereby, an erroneous flow is calculated, which has been problematic.

There has also been a problem that when a moving object is to be detected for each frame, more image frames have to be stored for the expanded intervals, requiring a great amount of memory, which has been problematic.

Patent Document 1: Japanese Laid-open Patent Publication No. 2007-172540

SUMMARY

A moving object detection apparatus for a moving picture in an embodiment includes a approaching object detection unit configured to calculate a moving distance of each characteristic point in an image frame obtained at time point t−1 on the basis of an image frame obtained at time point t and an image frame obtained at time point t−1, and configured to calculate, on the basis of the image frame obtained at time point t−1 and an image frame obtained at time point t+m (m>0), a moving distance of a characteristic point that is in the image frame obtained at time point t−1 and that has a moving distance to be less than a prescribed value.

First, the approaching object detection unit calculates a moving distance of a characteristic point between successive frames obtained at time points t−1 and t. When the calculated moving distance is less than a prescribed value, the approaching object detection unit calculates a moving distance of a characteristic point between image frames that are apart from each other by two time points or more. An object moving for a long distance in an image can be detected by the approaching object detection unit, and an object moving for a short distance in an image can be detected by the approaching object detection unit.

It is also possible to operate the approaching object detection unit again after incrementing value m above for a characteristic point having the moving distance calculated by the approaching object detection unit to be less than a prescribed value. It is also possible to track the movement of a characteristic point extracted from the image frame obtained at time point t−1.

The scope of the invention is not limited to the above moving object detection apparatus. The moving object detection method and programs or the like that make a computer execute the above moving object detection method are also included in the scope of the invention.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A, 4B and 4C illustrate an updating of a characteristic point tracking management table performed when a characteristic point is added;

FIGS. 6A and 6B illustrate updating of the characteristic point tracking management table performed when a redundant characteristic point is deleted;

FIG. 8 illustrates updating of the characteristic point tracking management table performed when an entry is added for a newly extracted characteristic point; and FIG. 9 is a flowchart of an approaching object detection process according to an embodiment.

DESCRIPTION OF EMBODIMENTS

Figure 1A:
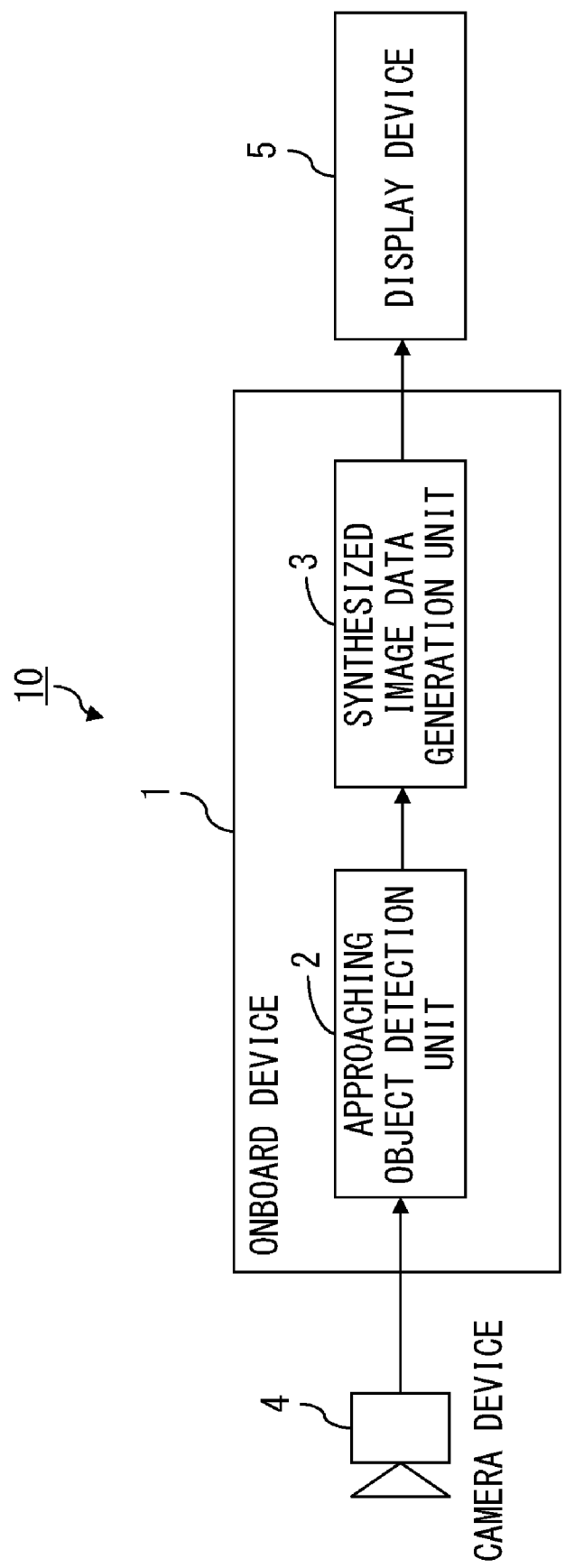
FIGS. 1A and 1B illustrate a configuration of an onboard blind-spot camera image apparatus in an embodiment of the invention.

Hereinafter, preferred embodiments of the invention will be explained by referring to the drawings.

Figure 1B:
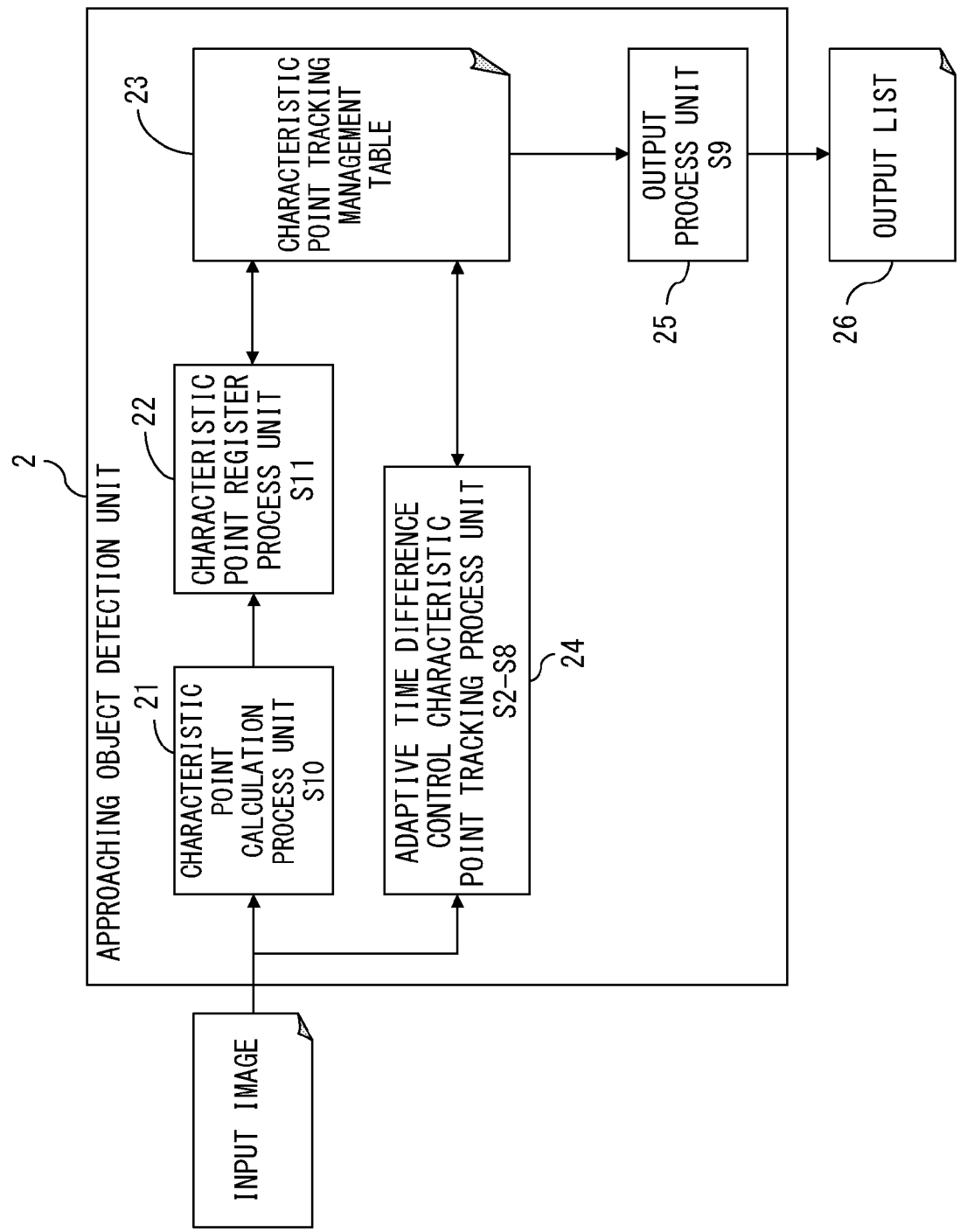

FIGS. 1A and 1B illustrate a configuration of an onboard blind-spot camera image apparatus in an embodiment of the invention. An onboard blind-spot camera image apparatus 10 illustrated in FIG. 1A includes an onboard device 1, a camera device 4, and a display device 5.

The camera device 4 includes, in an example, a fish-eye lens or a prism lens, and is arranged so that it can obtain images of the scenes to the right and left of the vehicle. The camera device 4 obtains images at prescribed time intervals so as to provide the images to the onboard device 1.

The display device 5 outputs and displays images obtained by the camera device 4 and processed by the onboard device 1, and is disposed at a position that allows the driver in the driver's seat to confirm the output image.

The onboard device 1 includes an approaching object detection unit 2 and a synthesized image data generation unit 3. The onboard device 1 detects a moving object in the image data input from the camera device 4, and outputs the images to the display device 5 in such a manner that the detected moving object is emphasized.

The approaching object detection unit 2 detects an approaching object by using an optical flow calculated for the interval between two frames. The synthesized image data generation unit 3 processes images of the approaching object detected by the approaching object detection unit 2, changes the display content by performing color coding using transparent colors or the like, and makes the display device 5 output and display the images.

FIG. 1B illustrates, more specifically, a configuration of the approaching object detection unit 2. The approaching object detection unit 2 includes a characteristic point calculation process unit 21, a characteristic point register process unit 22, a characteristic point tracking management table 23, an adaptive time difference control characteristic point tracking process unit (referred to as a characteristic point tracking process unit, hereinafter) 24, and an output process unit 25.

The characteristic point calculation process unit 21 extracts, from an image frame, a characteristic point indicating a corner or the like of the image. The extraction in an example uses a Harris operator, which well responds to corners of an object in an image, and uses the operation result by the Harris operator to calculate the coordinates that make the evaluation value the maximum value in a local window. The characteristic point register process unit 22 registers, in the characteristic point tracking management table 23, information relating to the characteristic point extracted by the characteristic point calculation process unit 21.

The characteristic point tracking process unit 24 refers to the characteristic point tracking management table 23. When prescribed conditions are met, the characteristic point tracking process unit 24 calculates, from the newly input image frame, the optical flow of the characteristic point registered in the characteristic point tracking management table 23, and updates the characteristic point tracking management table 23 in accordance with the value of the calculated optical flow. Processes performed by the characteristic point tracking process unit 24 will be described later in detail.

The output process unit 25 refers to the characteristic-point related information registered in the characteristic point tracking management table 23, and generates an output list 26 indicating the information relating to the characteristic point to be displayed after changing the content output to the display device 5. A synthesized image obtained by extracting, using a known technique, an edge area of a characteristic point from a partial image of the vicinity of a latest characteristic point and performing transparent color coding on the extracted edge area is output to the display device 5.

Figure 2:
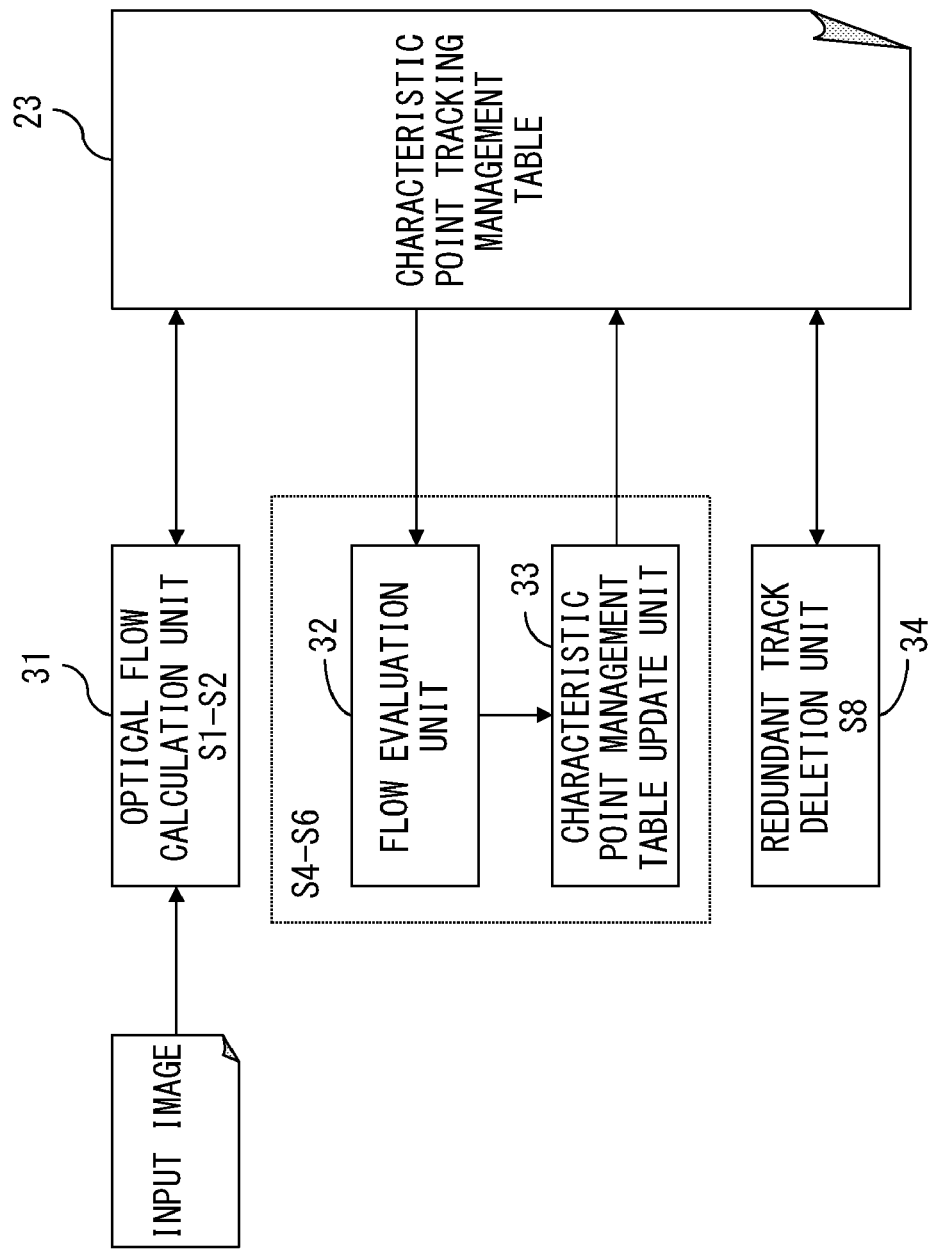
FIG. 2 illustrates a configuration of a characteristic point calculation process unit in more detail.

FIG. 2 illustrates a configuration of the characteristic point tracking process unit 24 in more detail. The characteristic point tracking process unit 24 includes an optical flow calculation unit 31, a flow evaluation unit 32, a characteristic point management table update unit 33, and a redundant track deletion unit 34. Hereinafter, the characteristic point tracking process will be explained by referring to FIG. 2.

The optical flow calculation unit 31 calculates an optical flow from an input image frame at time point t. When calculating an optical flow, the optical flow calculation unit 31 first refers to the characteristic point tracking management table 23 in order to extract time point "t−n(n≧1)" at which the characteristic point was detected. Thereafter, the optical flow calculation unit 31 compares, with prescribed threshold value Th, the time difference ($|t-(t-n)|=|n|$) between time point "t−n" and current time point t. When the time difference is smaller than threshold value Th, the optical flow calculation unit 31 calculates the optical flow of that characteristic point. In the present embodiment, the optical flow calculation unit 31 uses a block matching method so as to extract a block of 9×9 pixels from the image frame at time point t, and calculates the optical flow by using SAD (Sum of Absolute Difference) as an evaluation function of similar points between blocks. The optical flow is defined by the following expression.

[Numerical Expression 1]

$$(u,v) = \begin{cases} (0,0) & \text{if}(u,v)=(0,0) \ \& \sum_{(x,y)\in W}|I(x,y,t)-I(x,y,t-\Delta t)| < Th_{SAD} \\ \underset{(u,v)\neq(0,0)}{\operatorname{argmin}} \sum_{(x,y)\in W}|I(x,y,t)-I(x+u,y+v,t-\Delta t)| \end{cases} \quad (1)$$

First, the calculation of the upper portion (evaluation of the SAD values between the center coordinates) in the Numerical Expression 1 above is performed, and when the calculation result is smaller than prescribed threshold value $Th_{SAD}$, the movement is determined to be zero. This is because the onboard blind-spot camera image apparatus 10 illustrated in FIGS. 1A and 1B is often used while the vehicle is stopped at intersections. The flow of the center coordinates (around the center of an intersection) in an image is first calculated so as to perform subsequent processes only when the flow is not zero, thereby reducing the total amount of calculation in the calculation of the optical flow.

The flow evaluation unit 32 evaluates the magnitude of flow v=(vx, vy) calculated by the optical flow calculation unit 31. Specifically, when the magnitude of the flow |v| is greater than prescribed threshold value V, the flow evaluation unit 32 determines whether or not the characteristic point is an approaching object.

Specifically, the determination is performed on the basis of whether or not the direction of the horizontal components of flow v is inward with respect to a reference point such as the center of the image or the like. This is based on the fact that an object that is approaching the vehicle from the right or left moves toward the center in images obtained by, for example, a fish-eye lens. Additionally, when the vehicle is moving, an object approaching the vehicle moves toward the center of the images while the backgrounds move toward the peripheries of the images. As has been described in an example, the focus is on the fact that an area in the vicinity of a characteristic point moves differently from other areas, and by detecting such different movement, whether or not each object is an approaching object is determined.

Even when a lens other than a fish-eye lens—such as a prism lens or other normal lens—is used as the camera device 4, the above method can detect moving objects as long as the images include moving objects and backgrounds that move in the opposite directions, respectively.

The characteristic point management table update unit 33 updates the characteristic point tracking management table 23 when the flow evaluation unit 32 has determined that a flow is an approaching flow of a moving object. The characteristic point tracking management table 23 stores information including the coordinates of each characteristic point, and the characteristic point management table update unit 33 updates the coordinate values by adding the values of the respective components of flow v.

The redundant track deletion unit 34 deletes, from the table, information of characteristic points that have been determined to be redundant from among characteristic points managed on the characteristic point tracking management table 23. An example of a case when information is determined to be redundant and is deleted from a table is when only one of the characteristic points that are close to each other is left undeleted or when there is a characteristic point that cannot be tracked for a prescribed period of time or longer. A process of deleting redundant tracks will be explained later.

Next, FIGS. 3, 4A, 4B and 4C will be referred to in order to give specific explanations for a process of tracking a characteristic point to update the characteristic point tracking management table 23.

Figure 3:
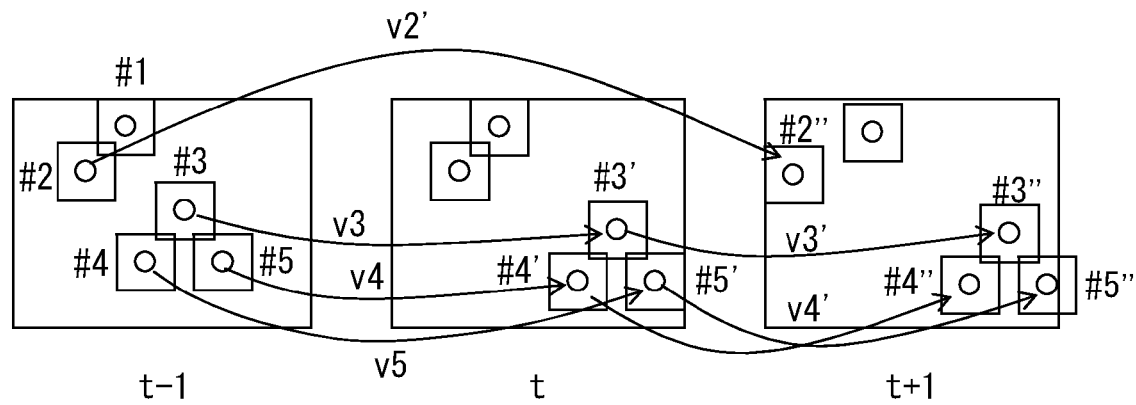
FIG. 3 illustrates a process of tracking a characteristic point.

FIG. 3 explains a process of tracking a characteristic point. FIGS. 4A, 4B and 4C illustrate updating of the characteristic point tracking management table 23 performed when a characteristic point is tracked. In this explanation, only characteristic points that are determined to be flows of approaching objects are illustrated, for simplicity.

FIG. 3 illustrates image frames at time points t−1, t, and t+1, including five characteristic points extracted in those image frames and the surrounding areas.

FIG. 4A illustrates the characteristic point tracking management table 23 after an approaching object detection process has been performed on the image frame at time point t−1. FIG. 4B illustrates the characteristic point tracking management table 23 after an approaching object detection process has been performed on the image frame at time point t. FIG. 4C illustrates the characteristic point tracking management table 23 after an approaching object detection process has been performed on the image frame at time point t+1.

The characteristic point tracking management table 23 with image patch data information, coordinate, a time point (TM), and the tracking number for each entry number is illustrated in FIGS. 4A, 4B and 4C.

Entry numbers serve as identification information for identifying extracted characteristic points. Image patch data information serves identification information for partial image data (patch data) for surrounding areas of characteristic points. Coordinates are the positional coordinates of characteristic points. Time points are the latest time points at which the characteristic points were detected. The tracking numbers are the numbers for detecting characteristic points in the flow detection processes.

The characteristic point tracking management table 23 may store the image of the surrounding area (peripheral image) of each characteristic point together with each piece of data above. When images of the vicinity of characteristic points (peripheral images) are stored, it is not necessary to hold memory areas (frame size×T) for past frames at t−1 through t−T used for tracking characteristic points. When, for example, this configuration is mounted on an LSI, it is not necessary to provide memory such as external DRAM for storing frames. Also, when a deletion/merge process for characteristic points that are spatially redundant is introduced, it is enough to secure a memory area for one frame size even when past T frames are used, and therefore, the cost can be reduced.

When the image frame at time point t is input to the approaching object detection unit 2 illustrated in FIGS. 1A and 1B, the coordinate of the characteristic point extracted at a past point (time point t−1 in the example illustrated in FIGS. 3, 4A, 4B and 4C) is read from the characteristic point tracking management table 23. The area around the read coordinate is checked in order to determine an area including a point corresponding to the characteristic point, and the flow is calculated.

The flow of the characteristic point with entry number "1" between time points t−1 and t is zero. Accordingly, as illustrated in FIGS. 4A and 4B, an update is not performed when the approaching object detection process is performed on the image frame at time t. When flows are not detected between successive frames, a flow is calculated between one frame and the frame at the next time point. However, the flow of the characteristic point with entry number "1" is zero also between time points t−1 and t+1, and accordingly, as illustrated in FIGS. 4B and 4C, an update is not performed when the approaching object detection process is performed on the image frame at time t+1.

Similarly to the above, the flow of the characteristic point with entry number "2" is zero between time points t−1 and t, and data is not updated between FIGS. 4A and 4B. However a flow other than zero (v2') has been detected as the flow between time points t−1 and t+1. Accordingly, as illustrated in FIG. 4C, on the characteristic point tracking management table 23 after the approaching object detection process has been performed on the image frame at time point t+1, a value obtained by adding calculated flow v2' to the coordinate of the characteristic point at time point t−1 is stored as the coordinate of the characteristic point with entry number 2. Also, "N2+1", which is obtained by adding one to N2, is stored as the tracking number, and a time point corresponding to the latest image frame for which a flow has been detected is stored as the time point.

In this example, the coordinate value of a characteristic point is newly obtained by adding the flow to the coordinate of the time point at which a characteristic point was detected for the first time. However, the scope of the invention is not limited to this example. It is also possible, for example, to extract a characteristic point from an image frame at a time point at which a flow other than zero was able to be detected and to obtain the coordinate of the extracted characteristic point.

Flows of the characteristic points with entry numbers "3" through "5" are detected both between time points "t−1" and t and between time points t and "t+1". In such a case, the coordinate values are sequentially updated on the basis of the flows (v3, v4, and v5) calculated between the image frames at time points "t−1" and t, and of the flows (v3', v4', and v5') calculated between the image frames at time points t and t+1. Time points and the tracking number are also updated in a manner similar to the above.

As described above, according to the onboard blind-spot camera image apparatus 10 illustrated in FIGS. 1A and 1B, a corner or the like in an image is extracted as a characteristic point from an image frame, and the movement of the extracted characteristic point is tracked. For each characteristic point, a search is made for an area corresponding to the characteristic point in image frames at and after a time point at which the characteristic point was extracted so as to calculate the optical flow. When the SAD value in a calculated optical flow is smaller than prescribed threshold value $Th_{SAD}$, the optical flow is determined to be zero. The magnitude |v| of flow v is determined to be greater than prescribed threshold value V, and thereby movements greater than a prescribed number of pixels are detected. Only when a movement is not detected between two successive image frames is the movement of a characteristic point estimated during a prescribed observation period Th. Thereby, the accuracy for detecting moving objects in distant spots is enhanced with a smaller amount of calculation.

Also, in the onboard blind-spot camera image apparatus 10 in the present embodiment, partial image data on the surrounding area of the detected characteristic point is held as patch data, and the coordinate values are stored in the characteristic point tracking management table 23. In processes for calculating optical flows, a point corresponding to a characteristic point at a past particular time point is obtained from an image frame at a current time point, and this eliminates the necessity of storing all pieces of past image data so that moving objects can be detected with a smaller amount of memory.

Specifically, when the size of patch data is 9×9 pixels, there can be about 150 characteristic points at most. Thus, to hold patch data requires 9×9×150, about 11 kilobytes. The size of one image frame size is 180×80 pixels, about 14 kilobytes, and a memory area smaller than one image frame is enough.

Next, explanations will be given for processes of deleting redundant tracks from the characteristic point tracking management table 23.

Figure 5:
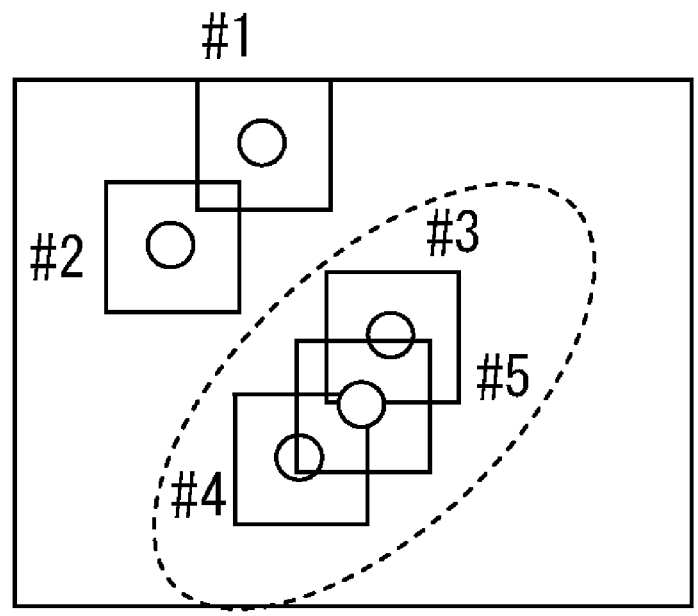
FIG. 5 illustrates a process of deleting redundant entries from the characteristic point tracking management table.

FIG. 5 illustrates a process of deleting redundant entries from the characteristic point tracking management table 23. FIGS. 6A and 6B illustrates updating of the characteristic point tracking management table 23 performed when redundant entries are deleted. FIG. 5 illustrates an image frame at time point t. Five characteristic points have been extracted at time points before time point t.

As illustrated in FIG. 5, the coordinates of the characteristic points with entry numbers 3 through 5 from among those five characteristic points are close to each other in the image frame at time point t. In such a case, it is possible that plural characteristic points have been extracted for an object. Thus, when there are plural characteristic points that are a prescribed distance D from each other or closer, the entry of at least one point is left in the table, and the entries of other characteristic points are deleted from the table. For example, only the maximum number of times of being tracked is left in the table while the other entries are deleted.

FIG. 6A illustrates the characteristic point tracking management table 23 before deleting redundant entries. FIG. 6B illustrates the characteristic point tracking management table 23 after deleting redundant entries.

Among the three characteristic points satisfying the condition that the distances between themselves be equal to or less than prescribed value D (#3 through #5), the characteristic point having a maximum number of times of being tracked (LEN in FIGS. 6A and 6B), in other words, only the entry (the entry with entry number 5) whose number of times of being tracked is five, is left, and the entries with entry numbers 3 and 4 are deleted from the characteristic point tracking management table 23. When those two entries have been deleted, the entry number of the entry that had had entry number 5 before the deletion is updated to 3.

In the above example, among characteristic points registered in the characteristic point tracking management table 23, points that are close to each other and have been able to be tracked for a long time period are left, and other characteristic points are deleted from the table. This is because characteristic points that have been able to be tracked for a long time are relied on in this example.

It is also possible, as another example, to manage past patch data information, coordinates, and time points, or the like in a form of list, and entries with the longest lists or longest time periods are left undeleted in updating of the characteristic point tracking management table 23.

Other conditions can be used in addition to the number of times of being tracked or the like. For example, it is also possible to select entries with linear movement paths as entries to be left in the table.

In such a case, an equation of a straight line for each characteristic point is obtained from the latest image and coordinate value by using least squares or the like. Then, on the basis of whether or not the characteristic point satisfies the obtained equation of straight line within a prescribed margin of error, it is determined whether or not the movement path of the characteristic point can approximate the obtained equation of a straight line used for obtaining the movement path of the characteristic point. By leaving characteristic points having linear movement paths, the movements of vehicles running on roads can be detected.

Alternatively, it is also possible to employ a configuration in which entries whose movement cannot be tracked for one second or longer are deleted in, for example, a system configuration using a fish-eye lens.

Figure 7A:
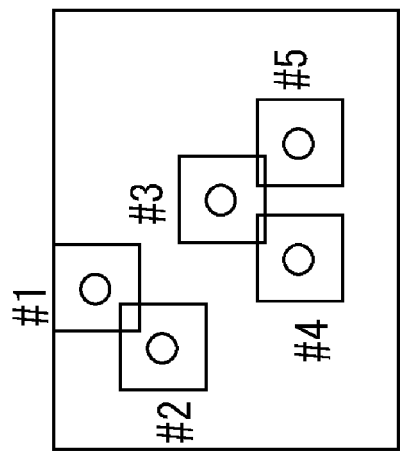
FIGS. 7A, 7B and 7C illustrate a process of newly extracting a characteristic point.
Figure 7B:
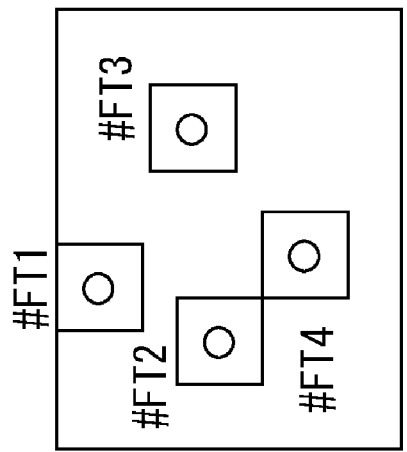
Figure 7C:
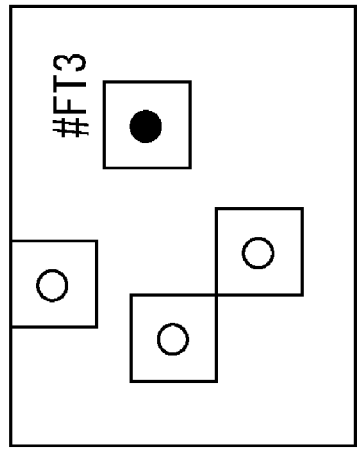

FIGS. 7A, 7B and 7C illustrates a process of newly extracting characteristic points. FIG. 8 illustrates updating of the characteristic point tracking management table 23 performed when entries for newly extracted characteristic points are added. By referring to FIGS. 7 A, 7B, 7C and 8, specific explanations will be given to a process of newly extracting characteristic points from input image data.

FIG. 7A illustrates characteristic points that have been tracked at and before time point t. FIG. 7B illustrates characteristic points extracted from the image frame at time point t. As was explained in FIGS. 1A and 1B, characteristic points are extracted by using a Harris operator in an embodiment.

The four characteristic points that have been extracted from the image frame at time point t are #FT1, #FT2, #FT3, and #FT4. The distances between those four characteristic points and characteristic points #1 through #5, which have already been registered in the characteristic point tracking management table 23, are obtained. When the obtained distance is equal to or greater than prescribed distance Dab, information such as the coordinates or the like of the newly extracted characteristic point is registered. Then, the partial image data of the characteristic point newly extracted from the image frame at time point t is picked up to be stored in memory. Past partial image data that has been stored in the memory is deleted.

In the example illustrated in FIGS. 7A, 7B and 7C, among the characteristic points newly extracted from the image frame at time point t, characteristic point #FT3 is apart from the characteristic point that is already managed in the table by a distance equal to or greater than threshold value Dad. In such a case, information such as the coordinates of characteristic point #FT3 is registered in the characteristic point tracking management table 23 so as to store the partial image data.

As illustrated in FIG. 8, the characteristic point to be added newly is registered with entry number "6" in the characteristic point tracking management table 23. Information of partial image data #FT3 for the surrounding area of characteristic point #FT3 is stored, and the coordinates of the characteristic point #FT3 in the image frame at time point t are stored.

FIG. 9 is a flowchart of an approaching object detection process according to the present embodiment. The process in FIG. 9 is executed each time an image frame obtained by the camera device 4 is input (at a one-thirty second interval in an example).

First, it is determined in step S1 whether or not time t at which the input image frame was obtained is the starting time, and when time t is the starting time, the approaching object detection process is not performed, and the process proceeds to step S10. When time t is not the starting time, the process proceeds to step S2.

In step S2, one of the entries registered in the characteristic point tracking management table 23 is referred to, and time point t of the image frame and the time point stored in the table are compared in order to determine whether or not the time point difference is smaller than threshold value Th. When the time point difference is smaller than threshold value Th, the process proceeds to step S3. When the time point difference is equal to or greater than threshold value Th, the process proceeds to step S7 so as to delete that entry from the characteristic point tracking management table 23. Thereafter, the process returns to step S2 so as to perform the above time difference determination on the next entry.

In step S3, from the image frame at time point t (current time), the block corresponding to the entry being referred to in the characteristic point tracking management table 23 is picked up in order to calculate optical flow v using above equation (1). Then, in step S4, whether or not the magnitude |v| of calculated optical flow v is greater than threshold value V is determined.

When the magnitude of optical flow v is determined to be equal to or smaller than threshold value V in step S4, it is determined that no movement was detected in the image frame at time point t for that entry, and the process returns to step S2.

When the magnitude of optical flow v is determined to be greater than threshold value V in step S4, the process proceeds to step S5 in order to determine whether or not calculated flow v is an approaching flow. As described above in an example, whether or not a flow is an approaching flow is determined on the basis of the direction of the vertical components of optical flow v. When the flow is not determined to be an approaching flow in step S5, the process returns to step S2 in order to perform the same processes as above for the next entry. When the flow is determined to be an approaching flow in step S5, the process proceeds to step S6.

In step S6, an updating process is performed on the entry being referred to. Specifically, the coordinate and the time point are updated into "x+v" and "t", respectively, and the number of times of being tracked is incremented by one. The image patch data is updated into information indicating that the partial image data at time point t is held.

Thereafter, the above processes are performed on all entries registered in the characteristic point tracking management table 23. Whether or not the above processes have been performed on all entries is determined, and when it is determined that the processes have been performed on all the entries, the process proceeds to step S8.

In step S8, entries of redundant characteristic points are deleted from the characteristic point tracking management table 23. A specific manner of the deletion has been explained when FIGS. 5 and 6 are referred to.

In step S9, the result of an approaching object detection process is output. In step S9, an entry in which, for example, the number of times of being tracked is equal to or greater than prescribed threshold value TN is output. In step S10, a new characteristic point is extracted from the image frame at time point t, and in step S11, necessary information is registered in the characteristic point tracking management table 23 for a characteristic point to be newly added, and the process is terminated. The processes of extracting new characteristic points and registering the characteristic points in the characteristic point tracking management table 23 in steps s10 and s11 are as have been explained by referring to FIGS. 7A, 7B, 7C and 8.

As has been explained, according to the onboard blind-spot camera image apparatus 10 in the present embodiment, among image frames obtained at respective time points, an optical flow between two image frames is calculated so as to detect a movement of an object in images. When a movement of an object is detected between successive image frames, that movement is tracked. However, when a movement of an object equal to or greater than a prescribed number of pixels is not detected between successive image frames, evaluation of a movement is conducted by using frames at next and subsequent time points. Thereby, it is possible to detect, highly accurately, a moving object in a distant spot without requiring information indicating whether the area of each spot is a distant spot or a near spot.

Additionally, although explanations have been given for an example of an onboard blind-spot camera image display apparatus (blind corner monitor), the invention can also be implemented by a program that makes a computer execute the above methods. The invention can also be applied to a case where moving objects are detected by a camera having a wide shooting scope, such as a monitoring camera or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A moving object detection apparatus for a moving picture, comprising:
    an approaching object detection unit configured to calculate a moving distance of each characteristic point in an image frame obtained at time point t−1, on the basis of an image frame obtained at time point t and an image frame obtained at time point t−1, and configured to calculate, on the basis of the image frame obtained at time point t−1 and an image frame obtained at time point t+m, a moving distance of a characteristic point that is in the image frame obtained at time point t−1 and that has a moving distance to be less than a prescribed value.

2. The moving object detection apparatus according to claim 1, wherein:
    the value m is incremented so as to again operate the approaching object detection unit on a characteristic point having a moving distance calculated by the approaching object detection unit to be less than a prescribed value.

3. The moving object detection apparatus according to claim 2, further comprising:
    an output unit configured to change a window display content of the characteristic point having the moving distance calculated by the approaching object detection unit to be greater than the prescribed value, and to output the content.

4. The moving object detection apparatus according to claim 3, wherein:
    the output unit changes a window display content of a characteristic point having a moving distance calculated by the approaching object detection unit to be greater than the prescribed value and having a number of times of being tracked greater than a prescribed threshold value, and outputs the content.

5. The moving object detection apparatus according to claim 2, wherein:
    the approaching object detection unit calculates a moving distance of a characteristic point moving inwardly in an image frame.

6. The moving object detection apparatus according to claim 2, further comprising:
    A storage unit configured to store information relating to a characteristic point extracted from an image frame, wherein:
    When a characteristic point is extracted newly, information relating to the newly extracted characteristic point is stored in the storage unit if a distance between the newly extracted characteristic point and a characteristic point already stored in the storage unit is equal to or greater than a prescribed threshold value.

7. The moving object detection apparatus according to claim 2, further comprising:
    a storage unit configured to store information relating to a characteristic point extracted from an image frame, wherein:
    among pieces of information stored in the storage unit, information relating to at least one characteristic point is left in the storage unit and other pieces of information are deleted when there are a plurality of characteristic points that are close to each other within a prescribed distance range in an image frame obtained at time point t+m.

8. The moving object detection apparatus according to claim 6, wherein:
    the storage unit further stores a peripheral image of each of the characteristic points in association with information relating to each of the characteristic points at time point t−1.

9. The moving object detection apparatus according to claim 2, wherein:
    the characteristic point is obtained by selecting a maximum point of an evaluation value of a degree of a corner of the image frame.

10. A computer readable storage medium storing a moving object detection program for detecting a moving object in a moving picture, making a computer execute processes of:
    calculating a moving distance of each characteristic point in an image frame obtained at time point t−1, on the basis of an image frame obtained at time point t and an image frame obtained at time point t−1; and
    calculating, on the basis of the image frame obtained at time point t−1 and an image frame obtained at time point t+m, a moving distance of a characteristic point that is in the image frame obtained at time point t−1 and that has a moving distance calculated to be less than a prescribed value.

11. A moving object detection method for detecting a moving object in a moving picture, comprising:
    a first step of calculating a moving distance of each characteristic point in an image frame obtained at time point t−1, on the basis of an image frame obtained at time point t and an image frame obtained at time point t−1; and
    a second step of calculating, on the basis of the image frame obtained at time point t−1 and an image frame obtained at time point t+m, a moving distance of a characteristic point that is in the image frame obtained at time point t−1 and that has a moving distance calculated by the first step to be less than a prescribed value.

* * * * *